United States Patent [19]

McKneely

[11] Patent Number: 4,844,305

[45] Date of Patent: Jul. 4, 1989

[54] CARGO COMPARTMENT ORGANIZER

[76] Inventor: James W. McKneely, Rte. 6, Box 2440, Nacogdoches, Tex. 75961

[21] Appl. No.: 919,055

[22] Filed: Oct. 15, 1986

[51] Int. Cl.⁴ .................. B60R 11/06; B65D 43/16
[52] U.S. Cl. .................. 224/42.42; 224/281; 224/311; 312/DIG. 33; 312/122; 312/338; 296/37.6
[58] Field of Search .............. 224/42.42, 273, 311, 224/281, 309, 324, 42.46; 296/24 R, 37.1, 37.6, 37.7, 100; 312/333, 338, 122, 250, DIG. 33

[56] References Cited

U.S. PATENT DOCUMENTS

| | | | |
|---|---|---|---|
| 2,716,046 | 8/1955 | Minturn | 312/286 |
| 2,784,027 | 5/1957 | Temp | 296/23 |
| 2,952,497 | 9/1960 | Bowden | 312/338 |
| 3,512,828 | 5/1970 | Craft | 296/100 |
| 3,765,717 | 10/1973 | Garvert | 296/137 B |
| 4,002,385 | 1/1977 | Hone | 312/286 |
| 4,288,011 | 9/1981 | Grossman | 224/42.42 |
| 4,469,364 | 9/1984 | Rafi-Zadeh | 296/37.6 |
| 4,488,669 | 12/1984 | Waters | 224/42.42 X |
| 4,573,731 | 3/1986 | Knaack et al. | 312/333 X |
| 4,600,255 | 7/1986 | Dubarko | 312/333 |

Primary Examiner—Ernest G. Cusick
Attorney, Agent, or Firm—Fisher, Christen & Sabol

[57] ABSTRACT

A tool box which is formed partially from the open cargo bed of a pickup truck or the like has drawers mounted on top of the cargo bed walls. The drawers slide from one side of the truck to the other. Because the drawers extend only partially from one side to the other and only partially from the top of the walls to the bottom, the drawers may slide away from one side to allow access to the space below the drawers. The drawers slide in a frame which is removably mounted on the tops of the walls so the cargo space may be easily converted back to an open cargo space. A cover is provided for the tool box which may be opened from either side of the truck. The cover provides protection from the weather and theft. The tool box maximizes the use of the space provided by the cargo compartment to accommodate the modern tradesman.

8 Claims, 2 Drawing Sheets

CARGO COMPARTMENT ORGANIZER

FIELD OF THE INVENTION

The invention relates to an apparatus for organizing and compartmentalizing cargo compartments. More in particular, the invention relates to an apparatus to maximize the use of a cargo compartment by providing slidable drawers in upper reaches of a cargo compartment and fixed compartments in the bottom of the cargo compartment.

BACKGROUND OF THE INVENTION

Pickup trucks and vehicles having open cargo compartments are used extensively for transporting purposes. Apparatuses have been developed to organize the cargo space and to minimize the motion of transported articles located therein during periods of transit. Such transported articles often need to be protected from inclement weather, so covering the cargo compartment becomes important. When many different articles are being transported at the same time, segregating the articles is also an important consideration. U.S. Pat. No. 3,512,828 to Craft and U.S. Pat. No. 3,765,717 to Garvert disclose apparatus for use in pickup truck cargo beds. Craft discloses a pickup bed cap having access doors. Garvert has a pickup truck cargo compartment cover which includes hinged doors. A tool box is located beneath the doors. Neither Craft nor Garvert disclose drawers.

U.S. Pat. No. 4,469,364 to Rafi-Zadeh discloses a toolbox for a pickup truck which has a cover. The toolbox is provided with drawers; however, the drawers travel lengthwise along a line of forward and rearward motion of the vehicle. U.S. Pat. No. 2,784,272 to Temp discloses a drawer unit for a pickup truck wherein a table forming drawer is provided to slide rearwardly outward from the pickup truck bed. Neither Rafi-Zadeh nor Temp disclose drawers which are slidable in directions transverse to the line of forward and rearward motion of the vehicle.

Drawers and their support structure in relation to stationary cabinets are well known. U.S. Pat. No. 4,002,385 to Hone and U.S. Pat. No. 2,716,946 to Minturn disclose drawers mounted beneath a countertop that may be pulled outwardly from either side of the counter. Neither of the drawers disclosed in Hone or Minturn are intended to be used in combination with a moving vehicle.

There is a need in the art for a pickup truck cargo compartment organizer which provides for maximum utility of the cargo space. Such a structure would provide organization and utility for the upper as well as lower regions of the cargo space in addition to protection from inclement weather.

Accordingly, it is an object of the invention to provide a pickup truck organizing apparatus having drawers slidable in the upper reaches of the cargo space wherein the drawers slide transverse to the forward and rearward line of motion of the vehicle.

It is another object of the invention to provide cover means for such drawers wherein the cover means provide drainage for water and do not obscure the rear cab window of a pickup truck.

It is yet another object of the invention to provide a pickup truck organizing apparatus wherein the drawers are slidable away from the sides of a cargo compartment to provide access between the support rails of the drawers to cargo space located below.

It is still another object of the invention to provide organizing apparatus on the bottom wall of a pickup truck cargo compartment to provide for organizing transported apparatus located in lower reaches of the cargo space.

These and other and further objects and features of the invention are apparent in the disclosure, which includes the foregoing and following specification, claims and drawings.

SUMMARY OF THE INVENTION

The invention is a cargo compartment organizer for a moving vehicle such as a pickup truck. The cargo compartment on a pickup truck is defined by and contained within vertical side walls rising above the rear wheels, the rear part of the cab and the tailgate. The invention maximizes the use of the cargo compartment.

There is a first frame means which is attached to the top of the cargo compartment to provide a water tight cover. The frame means preferably contains a plurality of drawer compartments which slidably receive drawers. The drawers slide from one side of the cargo compartment of the other. The drawer compartments are defined by rails for slidably supporting bottom lateral edges of the drawers and vertical walls orthogonal to the rails and coextensive therewith.

Transverse to the vertical walls and nesting within upper edges thereof about midway between the sides of the cargo compartment is a drain or gutter having first and second upper edges. The gutter extends the entire longitudinal length of the cargo compartment or top frame means. Fixedly attached to each of the upper edges of the gutter and coextensive therewith is a hinge member. Pivotally mounted and fixedly attached to each of these hinge members is a cover or lid.

The gutter or drain separates the cargo compartment into first and second sides and the first and second lids cover the respective first and second sides. The lids cover and protect the respective sides of the cargo compartment and provide access to the drawer compartments by lifting outer edges of the lids upwardly. This upward movement pivots the inner edges about the hinges.

Nesting within the drawer compartments are drawers. As noted above, the drawers are slidable from one side of the vehicle to the other. It is important to note that these drawers are slidable transverse to a forward and rearward line of motion for the moving vehicle. The drawers are approximately a one-half width of the pickup truck cargo compartment so an operator may raise either of the lids and access the contents of any of the drawers by merely sliding the drawers towards or away from the operator. In accordance with this feature, each drawer is provided with a handle on either side. Also, each drawer is provided with detent means for preventing lateral motion of the drawers while the vehicle is in transit. The detect means can be a latch bolt which can extend beyond the side of the drawers into a hole located at various points along the vertical walls of the drawer compartments.

The invention provides access to the entire cargo space of a cargo compartment by providing the ability to slide the drawers away from the sides of the vehicle to access the space below the drawers. In accordance with the object of this invention to organize cargo space, a second frame means is located and attached to the bottom wall of the cargo compartment. The second frame means contains a gridwork comprising dividers for separating and maintaining tools and various hardwares in discrete order.

The area beneath the drawers is accessible because the rails support only the lateral sides of the drawers and not the central portions so there is ample room to reach between the rails into the space below.

The edge of the first frame means extending over the tailgate does not interfere with the tailgate functions. Thus, an operator may open the tailgate and access the space below the first frame means without going through the first frame means.

The lids of the cover means slope downwardly from either side of the centrally located hinge means. This is to provide maximum water drainage during inclement weather. The inner edges of the lids preferably overhang the gutter area to protect the hinge members and to provide drainage. Similarly, the outer edges of the cover means overhang the sides of the first frame means to allow for water drain off.

The first frame means is attached to the cargo compartment by way of removable clamps. Preferably, the sides of the first frame means have inner horizontal edges resting upon top horizontal edges of the cargo compartment sides. These horizontal surfaces may be sandwiched together and held in fixed relation by means of a C-clamp or other fasteners. Removable clamping means is preferred so as to not limit the cargo space to a permanent relation with the invention. Thus, it is an object of the invention to maintain the versatility of the pickup truck cargo compartment.

The materials for constructing the apparatus of the invention can be virtually any well known building materials. Care should be taken, however, to ensure that the upper outer-most surfaces are weather proofed.

BRIEF DESCRIPTION OF DRAWINGS

While the specification concludes with claims particularly pointing out and distinctly claiming the subject matter that is regarded as forming the present invention, it is believed that the invention will be better understood from the following description accompanied by the following drawings in which:

DESCRIPTION OF THE PREFERRED EMBODIMENT

Figure 1:
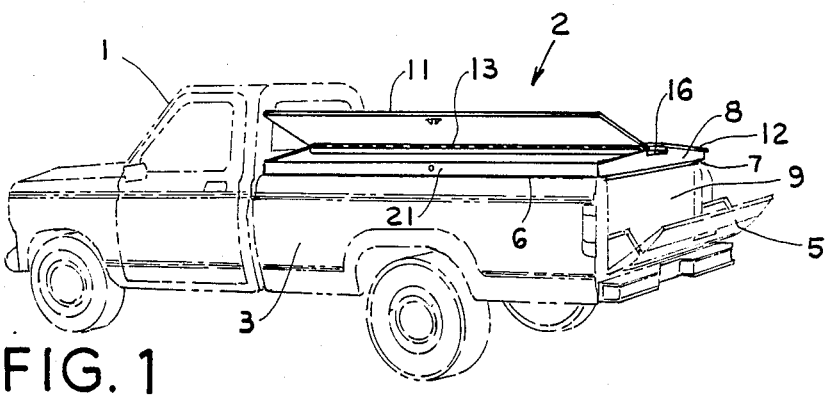
FIG. 1 is an elevated perspective of a pickup truck having its cargo compartment outfitted with the invention.
Figure 3:
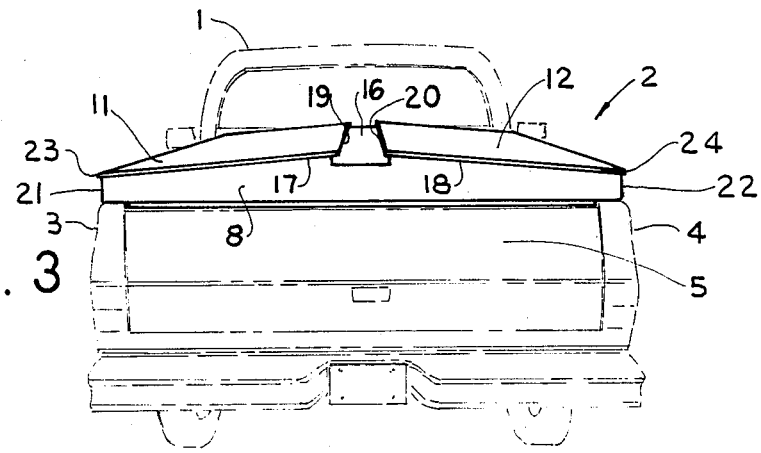
FIG. 3 is a rear elevated perspective of the invention mounted on a pickup truck cargo compartment.

The invention is a cargo compartment organizing apparatus. Referring to FIGS. 1 and 3, the invention is shown in combination with pickup truck 1. The invention is generally indicated by the number 2. The pickup truck 1 contains a cargo compartment which is defined by vertically extending walls 3 and 4 and tailgate 5. The invention 2 is attached to the top surfaces 6 and 7 of the vertically extending walls 3 and 4. The invention also includes a plurality of cross members 8, 36, 35 and 15 which are disposed transversely across the cargo compartment of the truck 1. The cross member 8 disposed closest to the tailgate 5 extends transversely across the cargo space 9 in such a fashion as to not interfere with the latching and unlatching of the tailgate 5. The vertically extending walls 3 and 4 extend along the longitudinal axis of the invention 2 and the cargo space 9.

Figure 6:
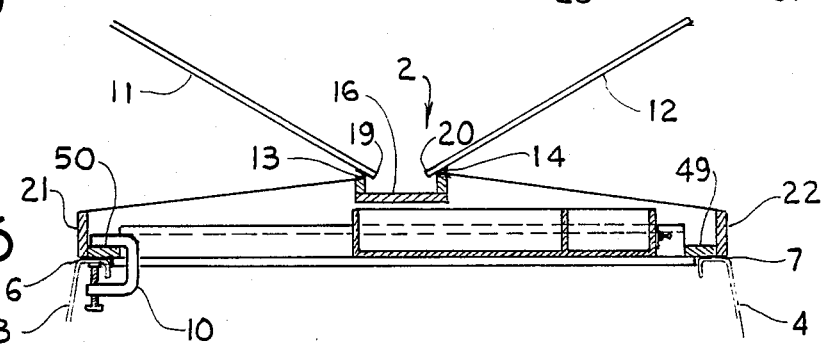
FIG. 6 is a cross-section of the invention taken along lines 6—6 of FIG. 4.

The attachment of the invention 2 to the truck 1 is shown in FIG. 6. Vertically extending walls 3 and 4 have top surfaces 6 and 7 upon which the invention is seated. Clamping means 10 is shown. Only one clamping means is shown in order to prevent obscuring other features of te invention. Clamping means 10 may be a C-clamp as is indicated in the FIG. 6; however, it should be noted that any means for attaching the invention 2 to the top 6 and 7 may be utilized. Such means can include threaded fasteners, rivets as well as bonding materials such as adhesives or solder. It is generally preferred, however, that the invention 2 be removably yet fixedly attached to the top surfaces 6 and 7 of the vertically extending walls 3 and 4 to maintain versatility of the cargo compartment. Removable clamping means are preferred because it is conceivable that the truck 1 would have other uses rather than hauling around such things as tools, etc. When desirable, the invention 2 may be removed from the cargo compartment so that the cargo compartment may be used for other purposes.

Figure 2:
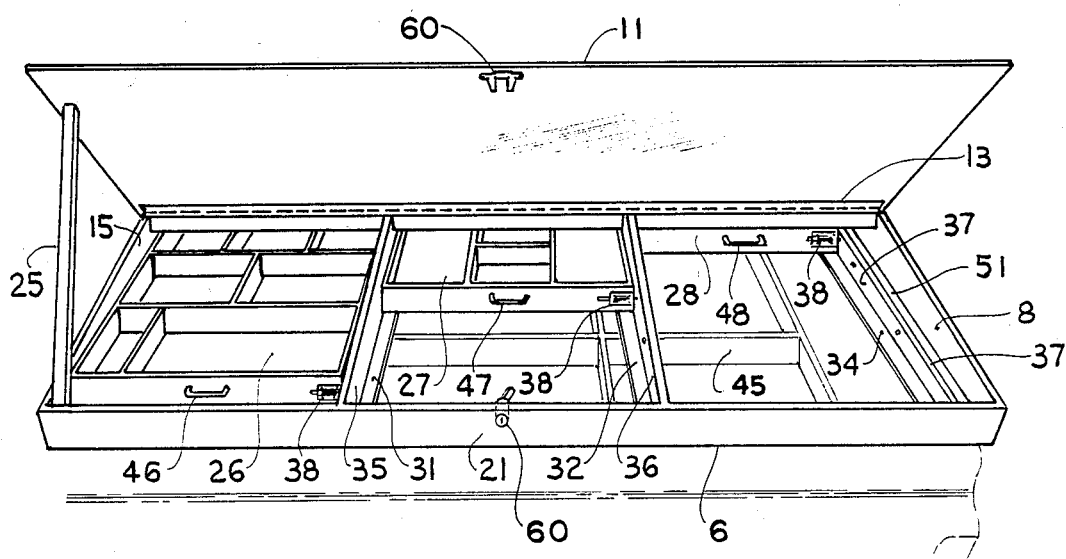
FIG. 2 is an elevated perspective of one side of the invention having its cover open.

The invention 2 includes at least two cover means 11 and 12 for protecting the inner compartments of the invention as well as the cargo compartment of the truck 1 from rain and other unwanted deposits. As seen in FIGS. 2 and 3, the cover means 11 and 12 may comprise a pair of covers or lids. When vehicle 1 is stationary, the inner compartments of the invention 2 may be accessed by pivoting the cover means 11 and 12 in an upward position as is shown in FIGS. 1, 2 and 6. When the truck is in motion, however, the covers 11 and 12 are normally positioned in the down position. As best seen in FIG. 3, a central longitudinal beam 16 is disposed in the middle of the invention 2, between the two cover means 11 and 12.

The pivoting of the cover means 11 and 12 is facilitated by hinge means 13 and 14. The hinge means 13 and 14 are attached to the top edge of the central longitudinal beam 16 as shown in FIGS. 1, 3, 4 and 6. The central longitudinal beam 16 is centered on and nesting within notches located on the cross members 8, 36, 35 and 15. It should be noted that the central longitudinal beam functions as a support for the hinge means 13 and 14 as well as a drain for water run off. As best seen in FIG. 3, cross member 8 (as well as all of the other cross members 36, 35, 15) has its top edges 17 and 18 sloped downwardly from the midpoint upon which the central longitudinal beam 16 sits. This is to angularly support cover means 11 and 12.

One of the primary features of the invention is that it is designed to fit upon a cargo compartment of a vehicle, for example, a pickup truck. Such vehicles are typically exposed to the elements year round and so the invention has been designed to shed water. In accordance with this feature of the invention, the cover means 11 and 12 have their inner longitudinal edges 19 and 20 overhanging the central longitudinal beam 16 as best seen in FIGS. 3 and 6. The overhanging feature prevents water from seeping in around the hinge means 13 and 14 and promotes collection of water on the horizontal surface of the central longitudinal beam 16. As best seen in FIG. 3, the outer longitudinal edges 23 and 24 of cover means 11 and 12 also have some overhang in relation to the vertical side pieces 21 and 22 of the invention 2 to promote water run off over the vertically extending walls 3 and 4 of the truck 1.

Access to the inner compartments of the invention 2 can be had from either side of the truck 1. Locking means 60 for keeping the cover means 11 and 12 fixedly secured to the vertical side pieces 21 and 22 of the invention 2 are shown in FIG. 2. It is to be expected that one ordinarily skilled in the art would know that such locking means 60 can be any latching or detent means.

When access to the inner compartments of the invention 2 is desired, an operator merely needs to open the locking means 60 securing the cover means 11 and 12 to the vertical side pieces 21 and 22 of the invention and pivot the cover means 11 or 12 in an upward fashion. (See FIGS. 1, 2 and 6.) One or both of the cover means 11 or 12 may be pivoted upwardly at any one time. In order to maintain one of the covers 11 or 12 in an upward position, some stationary holding means can be used such as rod 25. It should be noted that one ordinarily skilled in the art would know that rod 25 may be substituted with jointed lockable support means which may extend or be folded when the cover means 11 and 12 are pivoted upwardly or downwardly.

Figure 4:
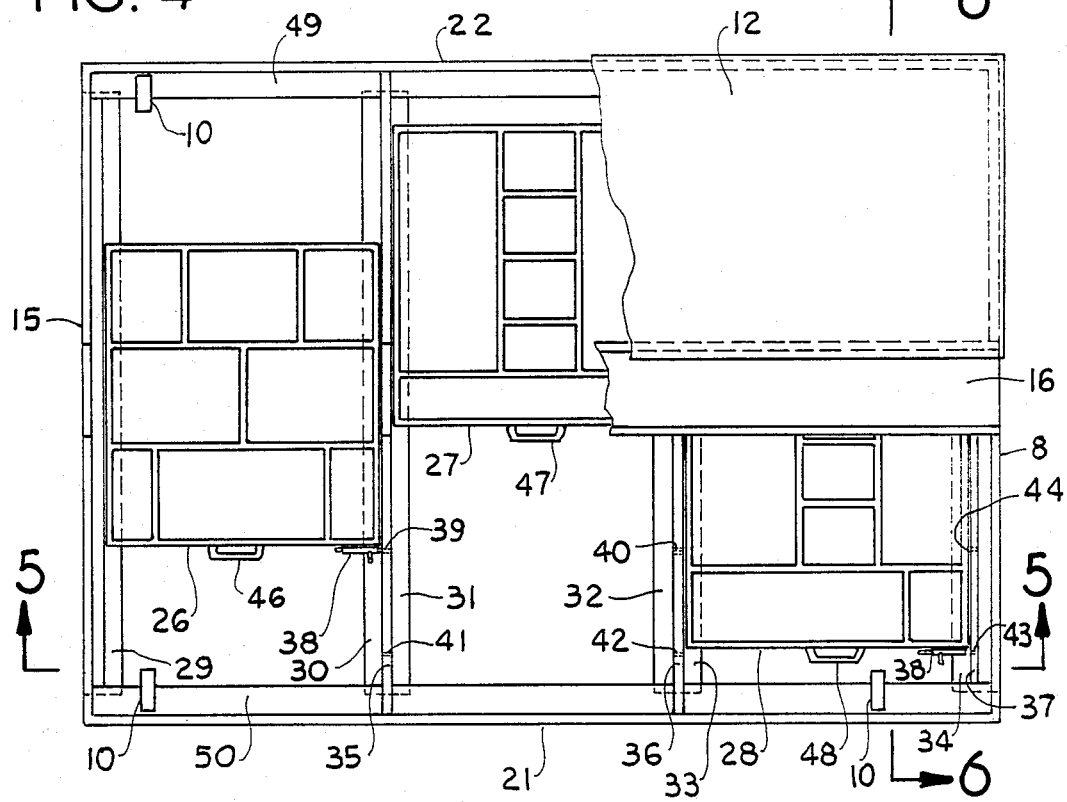
FIG. 4 is a top plan view of the invention with most of the cover removed.

Situated within the invention 2 are drawers 26, 27 and 28. The drawers 26, 27 and 28 may be variously compartmentalized in many fashions as is shown in FIGS. 2 and 4.

Figure 5:
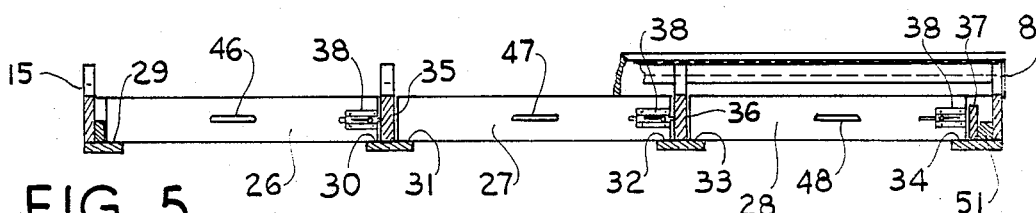
FIG. 5 is a cross-section of the invention taken along lines 5—5 of FIG. 4.

The drawers 26, 27 and 28 slide transverse to the longitudinal axis of the cargo compartment upon horizontal rails 29, 30, 31, 32, 33 and 34. As best seen in FIG. 5, the longitudinal movement of the drawers is constrained by three of the cross members 15, 35 and 36 and by a vertical rail 37 which is disposed near to the fourth cross member 8, which is nearest to the tailgate 5. As best shown in FIGS. 2, 4 and 5, the drawers are shown to be nesting within drawer compartments. For example, drawer 26 is shown to be nesting in a drawer compartment defined by cross member 15 and rail 29 and cross member 35 and rail 30. Likewise, drawer 27 is shown to be nesting in a drawer compartment defined by cross member 35 and rail 31 and cross member 36 with rail member 32. Similarly, drawer 28 is shown to be nesting in a drawer compartment defined by cross member 36 and rail 33 and vertical rail 37 and rail 34. The cross members 8, 35 and 36 and vertical rail 37 form vertical walls which are orthogonal to and connected with the horizontal rails.

FIG. 5 shows one embodiment detailing how the drawer compartments can be constructed for purposes of nesting the drawers 26, 27 and 28. The cross members 15, 35, 36 and vertical rail 37 can be substantially vertical members resting upon horizontal rails 29, 30, 31, 32, 33 and 34. For economy of structure, two horizontal rails may be constructed from one horizontally oriented member as shown with rails 30 and 31 and with rails 32 and 33.

The drawers 26, 27 and 28 are slidable along their associated rails and may be fixed stationary within their compartments by latching means 38. Latching means 38 is shown in FIGS. 2, 4 and 5. Holes 39, 40, 41, 42, 43 and 44 can be dispersed along the various cross members (8, 35 and 36) and along the vertical rail 37 for the purposes of receiving latching bolts from latching means 38. The latching means 38 which is illustrated in the figures is a typical reciprocating piston which is slidable in a track located upon the drawer. The piston may be extended beyond the side of a drawer and captured in the holes 39, 40, 41, 42, 43 and 44 located in the various cross members and the vertical rail 37. Those ordinarily skilled in the art will readily recognize there are other detect means for securing the drawers in various positions along their tracks which differ from the latching means described herein.

The various drawers 26, 27 and 28 may be held in various positions along the width of the cargo compartment as shown in FIG. 2. For example, drawer 27 is shown extending part ways across the cargo space. Drawer 28 is shown extending all the way across the cargo space. Situated on the bottom of the cargo space is a lower compartment organizer 45. One of the primary features of the invention is to enable an operator to access and organize the entire space of the cargo compartment. The drawers 26, 27 and 28 only inhabit an upper margin of the cargo space 9. When the drawers are shoved to one side, the lower regions of the cargo space may be accessed. In accordance with the general object of the invention which is to organize the cargo compartment, the lower compartment organizer 45, positioned on the lower surface of the cargo compartment is provided for organizing tools and maintaining them in separate status during periods of transit and for purposes of sorting. The lower compartment organizer 45 is comprised of a grid of vertically extending walls as is illustrated in FIG. 2.

The drawers 26, 27 and 28 are shown with handles 46, 47 and 48. The handles are shown attached to only one side of the drawers; however, it is to be understood that both sides of the drawers can be fitted with handles such that manipulation of the drawers can occur from either side.

Referring to FIGS. 4 and 6, horizontally oriented longitudinal members 49 and 50 are shown. These members provide end stops for the horizontal rails such that the drawers do not slide all the way to vertical side pieces 21 and 22. Furthermore, the horizontally oriented longitudinal members 49 and 50 are configured to ensure there is ample room for the handles 46, 47 and 48 between the horizontally oriented longitudinal members 49 and 50 and vertical side pieces 21 and 22.

Those readily skilled in the art will realize that many different types of material may be used to construct the apparatus of the invention. For example, wood, plastic or metal products may be used to construct any portion of the feature shown in the drawings. Attachment between frame members may be affected by way of threaded fasteners, adhesives, welding, common nails, rivets, etc.

The invention has been described as having a longitudinal axis such that the impression of rectangularity is given. However, it should be noted that the invention is adaptable to square or rectangular configurations. The rectangular configurations may have their longest sides running parallel with the length of the vehicle or running perpendicular with the direction of movement of the vehicle upon which the cargo compartment is located. When the term longitudinal axis is used it is meant to refer to a line running similar to line 5—5 in FIG. 4. That is to say, the longitudinal axis runs transverse to the horizontal rails 29, 30, 31, 32, 33 and 34 used to slidably support the drawers 26, 27 and 28. The drawers must slide perpendicular to the longitudinal axis so as to minimize motion along the horizontal rails 29, 30, 31, 32, 33 and 34 when the vehicle 1 is in motion.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as their conjointly cooperative equivalents are therefore intended to be embraced by those claims.

What I claim is:

1. A cargo compartment organizer for use with a pickup truck, said pickup truck having a cargo bed having a floor, a front wall, a tailgate and a pair of vertically extending walls, each of said pair of vertically extending walls having a top edge which is level with the top edge of the other of said pair of vertically extending walls, said cargo bed further including a cargo space defined by said floor, front wall, tailgate and pair of vertically extending walls said cargo compartment organizer comprising:

(a) a pair of horizontally oriented longitudinal members;

(b) a plurality of cross members attached to said pair of horizontally oriented longitudinal members, said plurality of cross members being perpendicularly disposed relative to said pair of horizontally oriented longitudinal members, whereby when said cargo compartment organizer is positioned for use, wherein said pair of horizontally oriented longitudinal members are positioned to overlie the top edges of said pair of vertically extending walls, said plurality of cross members will be transversely disposed relative to the length of said cargo space;

(c) clamping means for removably fastening said pair of horizontally oriented longitudinal members to said pair of vertically extending walls of the cargo bed of said truck;

(d) a plurality of horizontal rails attached to said pair or horizontally oriented longitudinal members, said plurality of horizontal rails disposed parallel to said plurality of cross members;

(e) a pair of vertical side pieces attached to said pair of horizontally oriented longitudinal members and to said plurality of cross members in an orthoganal fashion;

(f) a central longitudinal beam fixedly attached to said plurality of cross members, said central longitudinal beam disposed perpendicular to said plurality of cross members and disposed parallel to, and substantially equidistant from said pair of horizontally oriented longitudinal members, whereby said central longitudinal beam substantially bisects said cargo space;

(g) at least one drawer slidably mounted on said plurality of horizontal rails, whereby said at least one drawer may slide along said plurality of horizontal rails in a direction transversely oriented relative to said cargo space from one vertical side piece to the other, wherein the longitudinal motion of said at least one drawer relative to said cargo space is constrained by said plurality of cross members;

(h) a pair of cover means;

(i) hinge means fastened to said central longitudinal beam and said pair of cover means, whereby said pair of cover means maybe opened and closed relative to said cargo compartment organizer from either side of the truck, whereby when said pair of cover means is closed, said pair of cover means will overlie and protect said pair of vertical side pieces and said plurality of cross members, and whereby said pair of cover means will also protect said cargo space from rain, but whereby when said pair of cover means is opened said at least one drawer and said cargo space will be accessible.

2. The cargo compartment organizer of claim 1 further comprising a lower compartment organizer which may be positioned upon the floor of said cargo bed, beneath said at least one drawer and said plurality of horizontal rails, whereby said cargo space may be organized for efficient usage and storage.

3. The cargo compartment organizer of claim 1 wherein said at least one drawer includes a plurality of handles for facilitating the sliding of said at least one drawer from one side of said cargo compartment organizer to the other.

4. The cargo compartment organizer of claim 1 further including latching means for constraining the motion of said at least one drawer relative to said plurality of horizontal rails, whereby said at least one drawer may be positioned in the desired position relative to said plurality of horizontal rails and said plurality of cross members and immobilized.

5. The cargo compartment organizer of claim 1 wherein the top edges of said plurality of cross members are peaked, whereby each of said pair of cover means slope downwardly towards said pair of vertically extending walls of said cargo bed, whereby rain falling on said pair of cover means will be encouraged to run off of said pair of cover means.

6. The cargo component organizer of claim 5, wherein said plurality of cross members each have a notch and wherein said central longitudinal beam is disposed within each said notch, whereby said central longitudinal beam is disposed at a lower relative elevation than the longitudinal edges of said pair of cover means which are disposed proximate said hinge means whereby said central longitudinal beam may serve as a rain gutter.

7. The cargo component organizer of claim 1 further comprising a stationary holding means for immobilizing said pair of cover means in an open position.

8. The cargo component organizer of claim 1 further comprising locking means attached to said pair of vertical side pieces and said pair of cover means for holding said pair of cover means immobile in a closed position.

* * * * *